United States Patent [19]

Staffel et al.

[11] Patent Number: 5,165,904
[45] Date of Patent: Nov. 24, 1992

[54] PROCESS FOR PRODUCING AMMONIUM POLYPHOSPHATE

[75] Inventors: Thomas Staffel, Hürth; Reinhard Gradl, Erftstadt; Wolfgang Becker, Erftstadt; Gregor Fucker, Erftstadt, all of Fed. Rep. of Germany

[73] Assignee: Hoechst Aktiengesellschaft, Frankfurt am Main, Fed. Rep. of Germany

[21] Appl. No.: 766,422

[22] Filed: Sep. 26, 1991

[30] Foreign Application Priority Data

Oct. 10, 1990 [DE] Fed. Rep. of Germany ....... 4032133

[51] Int. Cl.$^5$ ............................................. C01B 25/40
[52] U.S. Cl. ..................................... 423/305; 423/315
[58] Field of Search .................... 423/315, 305

[56] References Cited

U.S. PATENT DOCUMENTS

| | | | |
|---|---|---|---|
| 3,978,195 | 8/1976 | Schrödter et al. | 423/305 |
| 4,260,592 | 4/1981 | Corver et al. | 423/305 |
| 4,511,546 | 4/1985 | Schrödter et al. | 423/315 |
| 5,043,151 | 8/1991 | Staffel et al. | 423/305 |

FOREIGN PATENT DOCUMENTS 2330174 12/1977 Fed. Rep. of Germany .
2154571 9/1985 United Kingdom .

OTHER PUBLICATIONS

Kirk-Othmer, *Encyclopedia of Chemical Technology*, Third Edition, vol. 2, p. 509, (1978), John Wiley & Sons.

*Primary Examiner*—Wayne Langel
*Attorney, Agent, or Firm*—Connolly & Hutz

[57] ABSTRACT

For producing substantially water-insoluble, chain-type ammonium polyphosphate, equimolar quantities of diammonium phosphate and phosphorus pentoxide are reacted at temperatures from 170° to 350° C. in a zone, which effects continuous mixing, kneading and comminution, in the presence of a stream of ammonia gas. In this process, the water is separated from the ammonia gas which leaves the zone and contains water vapor, and the dried ammonia gas is caused to flow again through the zone.

A plant for producing substantially water-insoluble, chain-type ammonium polyphosphate can comprise a reactor (1) into which an ammonia feed pipe (8) and pipes for feeding phosphorus pentoxide (6) and diammonium phosphate (7) lead and from which an ammonium polyphosphate discharge pipe (9) and an exit gas pipe (10) start. The exit gas pipe (10) leads into a condenser (13) which is flow-connected via a pump (14) to a heat exchanger (15). An exit gas line (18) which leads into the ammonia feed pipe (8) starts from the heat exchanger (15).

14 Claims, 1 Drawing Sheet

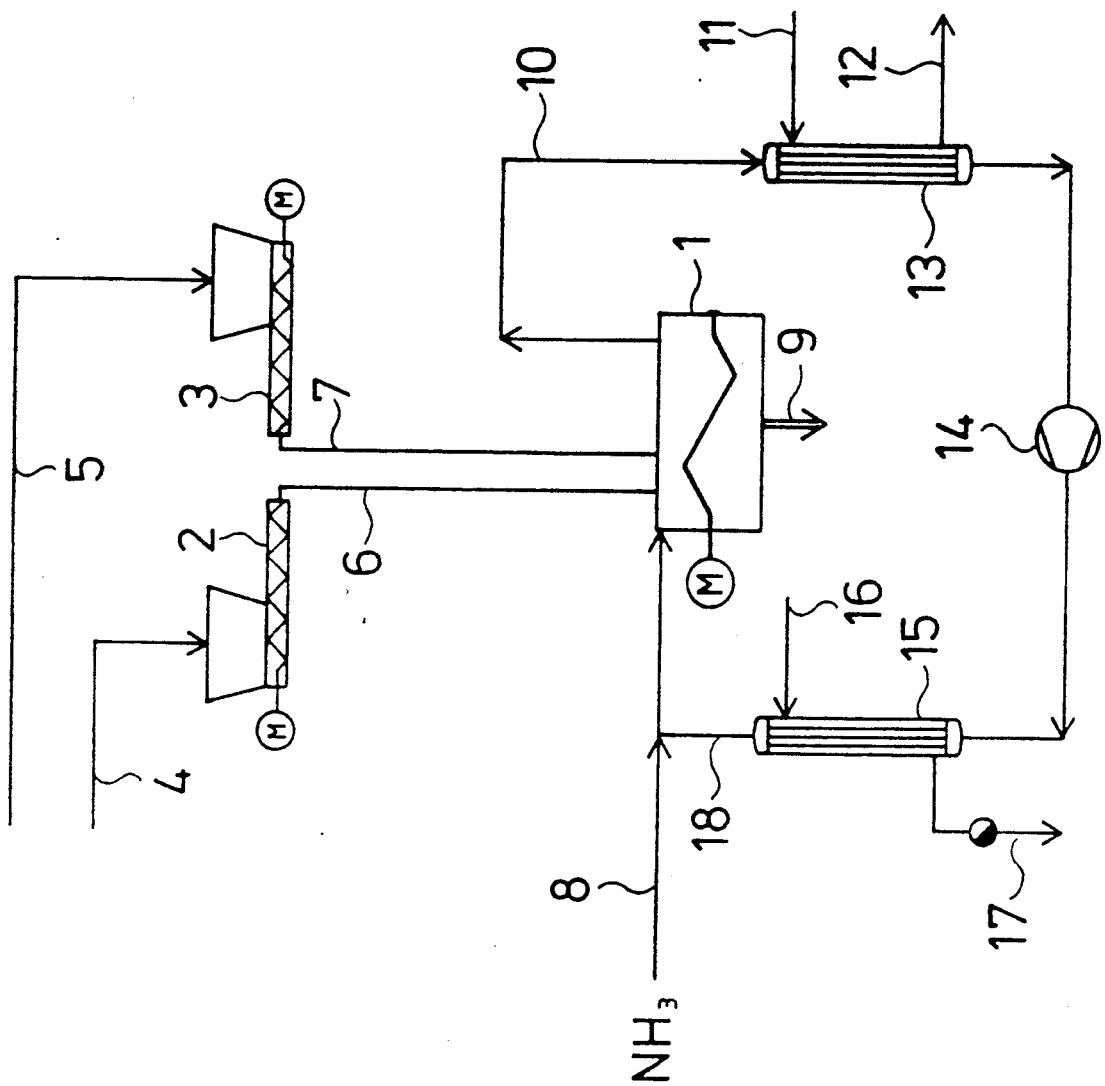

PROCESS FOR PRODUCING AMMONIUM POLYPHOSPHATE

The present invention relates to a process for producing substantially water-insoluble, chain-type ammonium polyphosphate from equimolar quantities of ammonium orthophosphate and phosphorus pentoxide at temperatures from 170° to 350° C. in a zone, which effects continuous mixing, kneading and comminution, in the presence of a stream of ammonia gas, and to a plant for carrying out the process.

In the production of ammonium polyphosphate by reaction of phosphorus pentoxide and diammonium phosphate with ammonia gas, for example by the process according to U.S. Pat. No. 3,978,195, it is necessary to maintain the ammonia atmosphere not only in the reaction phase, but also during the tempering phase in the reactor, since otherwise thermal decomposition of the ammonium polyphosphate starts. During the tempering phase, water vapor is released in the reactor by the progressing condensation of the phosphate groups, and this vapor must be removed in order to obtain an ammonium polyphosphate of high quality. It is therefore of importance even during the tempering phase to pass a greater rate of ammonia as a transport gas for the water vapor through the reactor, even though the ammonia consumption in this phase is lower than in the reaction phase. Blowing-off the exit gas containing water vapor and ammonia from the reactor into the atmosphere is, however, precluded for reasons of environmental protection. If the gases leaving the reactor during the tempering phase and laden with moisture and ammonia are absorbed in counter-current scrubbers, the resulting ammonia-containing liquid must be taken to an effluent treatment plant. It is then a disadvantage that major quantities of ammonia interfere with the operation of a biological effluent treatment plant.

It is therefore the object of the present invention to provide a process for producing substantially water insoluble ammonium polyphosphate from equimolar quantities of diammonium phosphate and phosphorus pentoxide in a zone, which effects continuous mixing, kneading and conmination, in the presence of a stream of ammonia gas, and a plant for carrying out the process, wherein neither ammonia-containing exit gas is blown off into the atmosphere nor ammonia-containing liquids arise in a quantity which interferes with the operation of a biological effluent treatment plant. According to the invention, this is achieved by separating the water from the ammonia gas which leaves the zone and contains water vapor, and causing the dried ammonia gas to flow again through the zone.

In addition, the process according to the invention can also be further developed, as desired, in such a way that a) the water is separated off from the ammonia gas containing water vapor by condensing it out in a cooling zone,
b) the cooling zone used is a condenser charged with a coolant having temperatures from $-20°$ C. to $+20°$ C.,
c) the water is separated from the ammonia gas containing water vapor by means of a molecular sieve having a pore diameter of 0.3 nm,
d) the ammonia gas containing water vapor is passed through a bed of solid caustic alkalis for separating off the water,
e) the ammonia gas containing water vapor is caused to pass through a concentrated aqueous caustic alkali solution for separating off the water,
f) lithium hydroxide, sodium hydroxide, potassium hydroxide or mixtures thereof are used as the caustic alkalis,
g) the dried ammonia gas is heated by indirect heat exchange before it flows again through the zone, and
h) additionally fresh ammonia gas is caused to flow into the zone.

A plant for carrying out the process according to the invention can comprise a reactor into which an ammonia feed pipe and pipes for feeding phosphours pentoxide and diammonium phosphate lead and from which an ammonium polyphosphate discharge pipe and an exit gas pipe start, wherein the exit gas pipe leads into a condenser, the condenser is flow-connected via a pump to a heat exchanger, and an exit gas line starting from the heat exchanger leads into the ammonia feed pipe.

This plant can also be further developed in such a way that i) the condenser is connected, for a coolant flow through it, to a supply line and a return line, and
j) the heat exchanger is connected to a steam feed line and a condensate discharge line.

In the process according to the invention, ammonia gas is circulated with the interposition of a regeneration stage in which the water originating from the reactor is removed.

In the attached drawing, a plant for carrying out the process according to the invention is diagrammatically illustrated.

A first metering device 2 for phosphorus pentoxide and a second metering device 3 for diammonium phosphate are located above a reactor 1. Feed pipes (4, 5) lead into the metering devices (2, 3) and, from the latter, pipes (6, 7) leading into the reactor 1 start. In addition, an ammonia feed pipe 8 leads into the reactor 1, while an ammonium polyphosphate discharge pipe 9 is arranged in the bottom of the reactor 1. An exit gas pipe 10 starts from the reactor 1 and leads into a condenser 13 which is provided with a supply line 11 and a return line 12 for a coolant. The condenser 13 is flow-connected to a pump 14 and to a heat exchanger 15 which is connected to a steam feed line 16 and a condensate discharge line 17. An exit gas line 18 leading into the ammonia feed pipe 8 starts from the heat exchanger 15.

EXAMPLE 1

In the production of ammonium polyphosphate in a kneading reactor according to U.S. Pat. No. 3,978,195, two reaction sections can be distinguished: in the first section, the entire content of the kneading reactor has a pasty consistency, whereas, after about half the reaction time, the content of the kneading reactor hardens and is ground by the kneading tools to give a fine powder. This powder has, for example, a pH of 2.9, an acid number of 60 mg of KOH/g and a water-soluble fraction (at 25° C. in a 10% aqueous suspension) of 40% and thus does not meet the specification.

For tempering this powder, a plant according to the Figure was used, in which the reactor 1 including the pipes (6, 7) leading into it was replaced by an electrically heatable tubular furnace. A sintered corundum boat containing 24 g of the fine powder in each case was introduced into the tubular furnace. The tubular furnace was heated to such an extent that the boat had a temperature of 280° C.

The tempering was carried out on seven different samples; the set parameters and the resulting ammonium polyphosphates can be taken from the Table.

EXAMPLE 2

Analogously to the process according to U.S. Pat. No. 3,978,195, 540 kg of phosphorus pentoxide via the pipe 6 and 500 kg of diammonium phosphate via the pipe 7 were introduced in the course of 30 minutes into the reactor 1 (cf. the Figure) designed as a kneader, which was heated to 140° C. Kneading was continued for 5 hours while introducing a total of about 80 $m^3$(S.T.P.) of ammonia. After the decrease in the power consumption of the motor on the reactor 1 indicated the end of the reaction phase, ammonia gas was circulated via the exit gas pipe 10, the condenser 13, the pump 14, the heat exchanger 15 and the exit gas line 18 and kneading was continued for 3.5 hours, fresh ammonia gas amounting to about 10% by volume of the circulated gas volume being introduced during this time via the ammonia feed pipe 8 into the circulation. At this stage, the temperature in the condenser 13 was 15° C., the gas flow in the circulation was 350 $m^3$/h and the gas temperature at the exit of the heat exchanger 15 was 160° C.

The ammonium polyphosphate then discharged from the discharge pipe 9 had a pH of 6.5, an acid number of 0.3 mg of KOH/g and a water-soluble fraction (at 25° C.) of 4.3%.

TABLE

| No. | Temperature in the condenser °C. | Gas flow l/h | Gas inlet temperature °C. | Reaction time h | pH >4.5 | Acid number mg of KOH/g <1 | Water-soluble fraction % <10 |
|---|---|---|---|---|---|---|---|
| | Desired target values | | | | | | |
| 1 | 12 | 150 | 25 | 1 | 7.3 | 0.0 | 6.4 |
| 2 | 12 | 1100 | 204 | 1 | 6.9 | 0.1 | 6.5 |
| 3 | 12 | 150 | 50 | 1 | 7.3 | 0.0 | 5.8 |
| 4 | 12 | 370 | 25 | 1 | 7.2 | 0.0 | 5.5 |
| 5 | −10 | 150 | 15 | 1 | 6.8 | 0.2 | 6.7 |
| 6 | 0 | 150 | 20 | 1 | 7.0 | 0.0 | 6.1 |
| 7 | 12 | 150 | 25 | 0.5 | 7.0 | 0.0 | 6.0 |

We claim:

1. A process for producing substantially water-insoluble, chain type ammonium polyphosphate, which comprises introducing equimolar quantities of reactants diammonium phosphate and phosphorous pentoxide into a zone, in which said reactants are continuously mixed, kneaded and comminuted at temperatures from 170° to 350° C. in the presence of streaming ammonia gas, separating the water from the ammonia gas leaving said zone and containing water vapor by condensing the water vapor out in a cooling installation, and causing the dried ammonia gas to flow again through said zone.

2. The process as claimed in claim 1, wherein the cooling installation used is a condenser charged with a coolant having temperatures from −20° C. to +20° C.

3. The process as claimed in claim 1, wherein the dried ammonia gas is heated by indirect heat exchange before it flows again through said zone.

4. The process as claimed in claim 1, wherein additional fresh ammonia gas is caused to flow into said zone.

5. A process for producing substantially water-insoluble, chain type ammonium polyphosphate, which comprises introducing equimolar quantities of reactants diammonium phosphate and phosphorus pentoxide into a zone, in which said reactants are continuously mixed, kneaded and comminuted at temperatures from 170° to 350° C. in the presence of streaming ammonia gas, separating the water from the ammonia gas leaving said zone and containing water vapor by means of a molecular sieve having a pore diameter of 0.3 nm, and causing the dried ammonia gas to flow again through said zone.

6. The process as claimed in claim 5, wherein the dried ammonia gas is heated by indirect heat exchange before it flows again through said zone.

7. The process as claimed in claim 5, wherein additional fresh ammonia gas is caused to flow into said zone.

8. A process for producing substantially water-insoluble, chain type ammonium polyphosphate, which comprises introducing equimolar quantities of reactants diammonium phosphate and phosphorus pentoxide into a zone, in which said reactants are continuously mixed, kneaded and comminuted at temperatures from 170° to 350° C. in the presence of streaming ammonia gas, separating the water from the ammonia gas leaving said zone and containing water vapor by passing said ammonia gas through caustic alkalis, and causing the dried ammonia gas to flow again through said zone.

9. The process as claimed in claim 8, wherein a bed of solid caustic alkalis is used.

10. The process as claimed in claim 9, wherein lithium hydorxide, sodium hydroxide, potassium hydroxide or mixtures thereof are used as the caustic alkalis.

11. The process as claimed in claim 8, wherein a concentrated aqueous caustic alkali solution is used.

12. The process as claimed in claim 11, wherein lithium hydroxide, sodium hydroxide, potassium hydroxide or mixtures thereof are used as the caustic alkalis.

13. The process as claimed in claim 8, wherein the dried ammonia gas is heated by indirect heat exchange before it flows again through said zone.

14. The process as claimed in claim 8, wherein additional fresh ammonia gas is caused to flow into said zone.

* * * * *